United States Patent
Bergey

(10) Patent No.: US 12,554,039 B2
(45) Date of Patent: Feb. 17, 2026

(54) PROCESS FOR DEFINING THE LOCATIONS OF A PLURALITY OF WELLS IN A FIELD, RELATED SYSTEM AND COMPUTER PROGRAM PRODUCT

(71) Applicant: TOTAL SA, Courbevoie (FR)

(72) Inventor: Pierre Bergey, Paris la Defense (FR)

(73) Assignee: TOTALENERGIES ONETECH, Courbevoie (FR)

(*) Notice: Subject to any disclaimer, the term of this patent is extended or adjusted under 35 U.S.C. 154(b) by 454 days.

(21) Appl. No.: 16/650,649

(22) PCT Filed: Sep. 26, 2017

(86) PCT No.: PCT/IB2017/001323
§ 371 (c)(1),
(2) Date: Mar. 25, 2020

(87) PCT Pub. No.: WO2019/064037
PCT Pub. Date: Apr. 4, 2019

(65) Prior Publication Data
US 2020/0249375 A1     Aug. 6, 2020

(51) Int. Cl.
*G01V 20/00*     (2024.01)
*G01N 33/24*     (2006.01)
(Continued)

(52) U.S. Cl.
CPC ........... *G01V 20/00* (2024.01); *G01N 33/241* (2013.01); *G06F 30/10* (2020.01); *G06F 30/28* (2020.01); *G06F 2111/04* (2020.01)

(58) Field of Classification Search
CPC ...... G01V 99/005; G01V 99/00; G01V 20/00; G01N 33/241; G06F 30/10; G06F 30/28; G06F 2111/04; E21B 49/00; E21B 43/305
See application file for complete search history.

(56) References Cited

U.S. PATENT DOCUMENTS 6,549,879 B1 *  4/2003  Cullick ................... E21B 49/00
                                                    703/2
7,877,246 B2 *  1/2011  Moncorge ............... E21B 43/00
                                                    703/10
(Continued)

FOREIGN PATENT DOCUMENTS

WO        0123829 A2    4/2001
WO     2010056415 A1    5/2010
(Continued)

OTHER PUBLICATIONS

Sharifi, Mohammad, Kelkar, Mohan, Bahar, Asnul, and Tormod Slettebo. "Dynamic Ranking of Multiple Realizations by Use of the Fast-Marching Method." SPE J. 19 (2014): 1069-1082. doi: https://doi.org/10.2118/169900-PA (Year: 2014).*

(Continued)

*Primary Examiner* — Ryan F Pitaro
*Assistant Examiner* — Pursottam Giri
(74) *Attorney, Agent, or Firm* — McDonald Hopkins LLC

(57) ABSTRACT

The process comprises positioning wells one after another in a group of potential cells of a geocellular model, each positioning of a well comprises: calculating for each cell of the group of potential cells, a fluid property insertion point driver (DFP1) representative of a fluid property maximization; calculating for each cell of the group of potential cells, a maximized distance insertion point driver (DMD1) representative of a maximization of a distance to another cell or group of cells having at least an undesired property; calculating for each cell of the group of potential cells a combined insertion point driver based on the fluid property insertion point driver (DFP1) and the maximized distance insertion point driver (DMD1); defining a well insertion point of the well being positioned at the cell having a maximal combined insertion point driver.

21 Claims, 7 Drawing Sheets

(51) Int. Cl.
  *G06F 30/10* (2020.01)
  *G06F 30/28* (2020.01)
  *G06F 111/04* (2020.01)

(56) References Cited

U.S. PATENT DOCUMENTS

| | | | | |
|---|---|---|---|---|
| 2008/0154505 | A1* | 6/2008 | Kim | E21B 43/00 |
| | | | | 702/2 |
| 2009/0216505 | A1* | 8/2009 | Sarma | G01V 11/00 |
| | | | | 703/2 |
| 2010/0057418 | A1* | 3/2010 | Li | G06F 30/28 |
| | | | | 703/10 |
| 2010/0125349 | A1* | 5/2010 | Abasov | E21B 43/30 |
| | | | | 705/1.1 |
| 2011/0046903 | A1* | 2/2011 | Franklin | G01M 3/3263 |
| | | | | 702/51 |
| 2011/0313743 | A1* | 12/2011 | Oury | E21B 43/30 |
| | | | | 703/10 |
| 2013/0074470 | A1* | 3/2013 | Ayasse | E21B 43/305 |
| | | | | 60/39.12 |
| 2013/0342557 | A1* | 12/2013 | Finlayson | H04N 1/60 |
| | | | | 358/1.9 |
| 2014/0365192 | A1* | 12/2014 | Cheng | E21B 41/00 |
| | | | | 703/10 |
| 2015/0039276 | A1* | 2/2015 | Maucec | E21B 47/10 |
| | | | | 703/2 |
| 2015/0094994 | A1* | 4/2015 | Sequeira, Jr. | G01V 20/00 |
| | | | | 703/1 |
| 2015/0120255 | A1* | 4/2015 | King | E21B 43/00 |
| | | | | 703/2 |
| 2016/0231462 | A1* | 8/2016 | Ramsay | G06F 17/11 |
| 2016/0245953 | A1* | 8/2016 | Al-Nahdi | E21B 47/06 |
| 2018/0230782 | A1* | 8/2018 | Pankaj | G01V 1/282 |

FOREIGN PATENT DOCUMENTS

| | | |
|---|---|---|
| WO | 2013180705 A1 | 12/2013 |
| WO | 2014200685 A2 | 12/2014 |
| WO | 2016010813 A1 | 1/2016 |
| WO | 2016010819 A1 | 1/2016 |

OTHER PUBLICATIONS

Lallier, F. L., et al. "An efficient well test forward model based on the fast marching method-application to geomodel sorting." ECMOR XIV—14th European conference on the mathematics of oil recovery. EAGE. doi. vol. 10. 2014. (Year: 2014).*

Manchuk et al (Optimization of Paved Drainage Area Configurations for SAGD. No. 14. Technical Report) (Year: 2012).*

Li, D., A. S. Cullick, and L. W. Lake. "Global scale-up of reservoir model permeability with local grid refinement." Journal of Petroleum Science and Engineering 14.1-2 (1995): 1-13. (Year: 1995).*

International Search Report for PCT/IB2017/001323 dated Jun. 8, 2018.

* cited by examiner

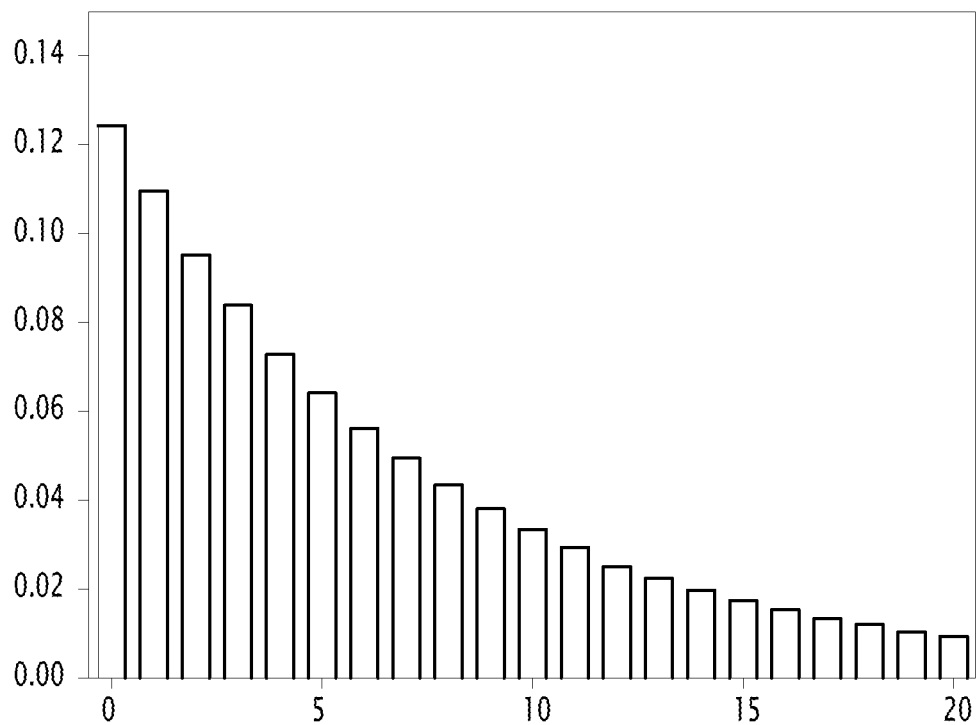
FIG.3
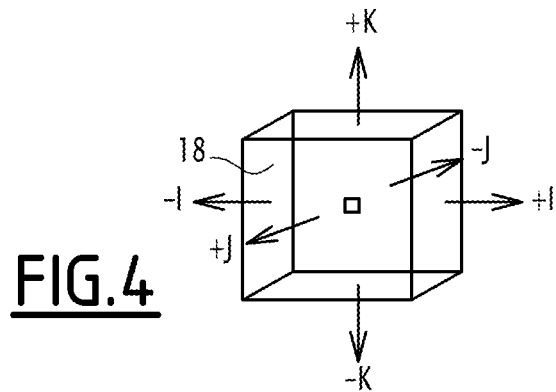
FIG.4
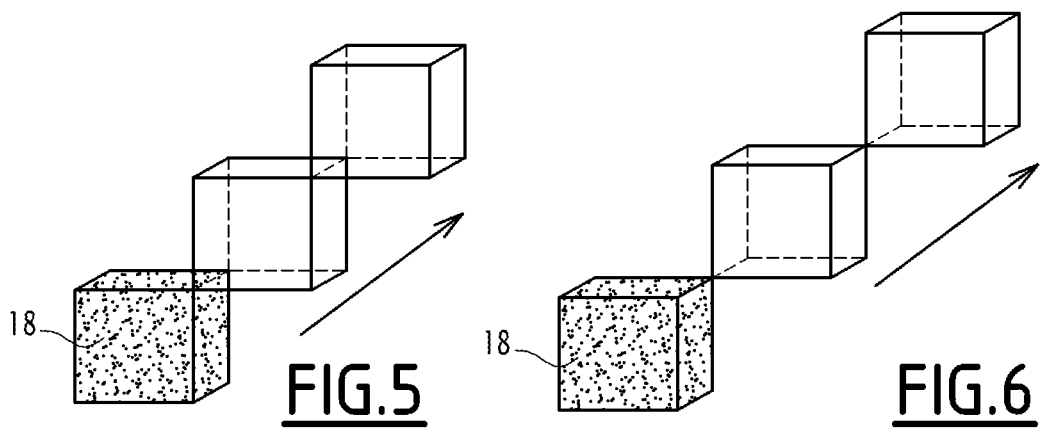
FIG.5
FIG.6

PROCESS FOR DEFINING THE LOCATIONS OF A PLURALITY OF WELLS IN A FIELD, RELATED SYSTEM AND COMPUTER PROGRAM PRODUCT

BACKGROUND OF THE INVENTION

The present invention relates to a process for defining the locations of a plurality of wells in a field, the process being carried out by an electronic location defining system and comprising the following steps:
  acquiring a geocellular model of the field, the model defining a plurality of cells, each cell being provided with fluid properties including at least a fluid density property and at least a fluid flow property for at least two fluid phases;
  selecting a group of potential cells able to become a well location.

The method applies in particular for the design of wells in a field containing a hydrocarbon reservoir. It also applies in the design of carbon dioxide injection wells in carbon dioxide sequestration applications or in the design of water injection wells in hydrogeological applications. More generally, the method applies to any application in which one or more fluids are injected into or produced from a field in the subsoil.

The positioning of wells is a critical task in the production of a field containing a hydrocarbon reservoir. Indeed, the respective positions of producer wells and/or of injector wells, is a factor which may greatly affect the productivity of the field and the volume of hydrocarbon recovered, hence its profitability.

A numerical gridded model of the field is often generated to determine the properties of the reservoir contained in the field, including geology, infrastructure, and fluid properties.

Based on this model and on raw field data, a team of scientists determine the best potential locations for wells, usually based on experience, taking into account the constraints which exist in the field, such as distance to surface well head clusters or platforms. Key design parameters include spacing between wells, well drain length and well configurations. This process is time consuming and requires significant human effort and skill.

Software products have been developed to help positioning wells relative to the reservoir. These software products are usually based on calculations of geographic coordinates of the wells. Each well to be positioned is usually defined by a set of three coordinates for each end of the well drain (i.e the fraction of the well length where flow occurs between the reservoir and the wellbore). Therefore, the software must optimize at least six parameters per well. For a set of fifteen wells, the number of parameters raises to ninety, which becomes costly and lengthwise to solve, if possible.

In order to overcome this drawback, methods have been developed to improve well positioning, while decreasing the required resources in terms of computers or human force, by notably reducing the number of variables to be optimized.

For example, WO 01/23829 discloses a process of positioning wells in a field comprising calculating a reservoir quality, and optimizing the position of the wells by maximizing the reservoir quality compared to the cost for drilling and completion. This process takes into account constraints which are fixed by the operators to position the wells.

Such a process reduces the quantity of calculations required for obtaining a definition of the wells locations. It nevertheless still requires a great number of variables to be solved.

One aim of the invention is to obtain a very efficient process for determining well positions in a field, which significantly reduces human input and improves computational time, while obtaining reliable results for improving productivity.

SUMMARY OF THE INVENTION

To this aim, the subject-matter of the invention is a process of the above type, characterized by positioning wells one after another in the group of potential cells, each positioning of a well comprising:
  calculating for each cell of the group of potential cells, at least one fluid property insertion point driver representative of a fluid property maximization;
  calculating for each cell of the group of potential cells, at least one distance maximization insertion point driver representative of a maximization of a distance to another cell or group of cells having at least an undesired property, the undesired property being chosen among a cell containing a fluid phase which production from or injection into is not desired or a cell containing a well of the same type that the well being positioned;
  calculating for each cell of the group of potential cells a combined insertion point driver based on the at least one fluid property insertion point driver and the at least one distance maximization insertion point driver;
  defining a well insertion point of the well being positioned at the cell having a maximal combined insertion point driver.

The process according to the invention may comprise one or more of the following features, taken solely or according to any possible technical combination:
  the positioning of a subsequent well is carried out after the positioning of a former well has been completed;
  each successive positioning of a well comprises calculating, for each cell of the group of potential cells, at least one optimization distance insertion point driver representative of an optimized distance to wells of different types than the well being positioned, the combined insertion point driver being further calculated based on the at least one optimization distance insertion point driver;
  the optimized distance is calculated for each well being positioned based on a distance to at least one already defined producer well and based on an accumulation of the produced phase in each cell;
  the at least one distance maximization insertion point driver is calculated for each cell based on a diffusive time of flight from the cell to the cell or group of cells having undesired properties;
  the cells or group of cells having undesired properties are located at an interface between two fluids, in particular a gas-to-oil interface or an oil-to-water interface, and/or at an interface between two fluids with a predefined offset;
  the fluid property driver is calculated based on a window average of the fluid property taken around the cell;
  the fluid property driver is calculated from a decreasing moving average in at least two directions from each cell, the decreasing moving average being preferentially a normalized exponential moving average in three directions;
  each successive positioning of a well comprises, after at least an insertion point of a well has been positioned, calculating at least one local insertion driver maximizing the distance to other cells of the same well, the combined insertion point driver being calculated further based on the at least one local insertion driver;

each successive positioning of a well comprises, after at least an insertion point of a well has been positioned, defining a toe and a heel of the well based on a predefined drain length distance, such as a maximum drain length distance and a half drain distance;

it comprises defining a local insertion point region based on the predefined drain distance, and/or based on a geometrical constraint;

the fluid density property comprises a fluid accumulation, the fluid flow property comprising a transmissibility;

it comprises defining the location of a plurality of producer wells and of a plurality of injector wells, the process comprising positioning all the producer wells, then positioning all the introducer wells or placing alternatively producer wells and injector wells;

acquiring a geocellular model of the field comprises acquiring a plurality of model realization of the model, the process comprising determining at least a first insertion point for a first well in each of the model realizations based on a maximized combined insertion point driver for each model realization and defining a preferred insertion point for the first well common to each model realization, based on the plurality of first insertion points for the first well in each of the model realizations; then placing at least a second well insertion point for a second well distinct of the first well in each of the model realizations based on a maximized combined insertion point driver for each model realization, without modifying the position of the or each insertion point for the first well defined based on the plurality of model realizations;

calculating each insertion point driver for each cell comprises normalizing the insertion point driver based on the maximal value of the insertion point driver among all cells, the calculation of the combined insertion point driver advantageously comprising multiplying each insertion point driver with a predefined constant and bringing the product of the insertion point driver with the predefined constant to an exponent;

the well type is chosen among an injector well and a producer well.

The invention also relates to an electronic system for defining the location of a plurality of wells in a field comprising:

a module for acquiring a geocellular model of the field, the model defining a plurality of cells, each cell being provided with fluid properties including at least a fluid density property and at least a fluid flow property for at least two fluid phases;

a module for selecting a group of potential cells able to become a well location;

characterized by a module for positioning wells one after another in the group of potential cells, the module for positioning wells comprising:

an application for calculating for each cell of the group of potential cells, at least a fluid property insertion point driver representative of a fluid property maximization;

an application for calculating for each cell of the group of potential cells, at least a distance maximization insertion point driver representative of a maximization distance to another cell or group of cells having at least an undesired property, the undesired property being chosen among a cell containing a fluid phase which production from or injection into is not desired or a cell containing a well of the same type that the well being positioned;

an application for calculating for each cell of the group of potential cells a combined insertion point driver based at least on the fluid property insertion point driver and the distance maximization insertion point driver;

an application for defining a well insertion point of the well being positioned at the cell having a maximal combined insertion point driver.

The invention also concerns a computer program product comprising instructions which, when the program is executed by a computer, cause the computer to carry out the process as defined above.

BRIEF DESCRIPTION OF THE FIGURES

The invention will be better understood upon reading of the following description, given solely as an example, and made in reference to the appended drawings, in which:

FIG. 3 is a schematic view of an exponential average calculation of a fluid insertion point driver in the method according to the invention;

FIGS. 4 to 6 are different embodiments of the implementation of a fluid property insertion point driver calculation;

DETAILED DESCRIPTION OF THE INVENTION

A first process according to the invention is carried out for defining the locations of a plurality of wells 10, 12 in a field 14 containing a fluid reservoir (see FIGS. 9 to 12). The fluid reservoir is located in a subsurface, onshore or offshore.

The reservoir generally contains at least a first fluid to be produced, and potentially a second auxiliary fluid to be produced along with the first fluid. A third fluid and/or a fourth fluid are advantageously used to be injected in the reservoir to drive the production of the first and/or of the second fluid.

For example, the first fluid is oil and/or gas, the second fluid being gas and/or oil. The third fluid and/or fourth fluid are generally water, gas, and/or oil. The first fluid and the second fluid are preferentially hydrocarbons.

The reservoir may comprise several regions, for example at least an aquifer, an oil leg, and a gas cap. An aquifer is generally delimited upwards by a water oil contact or "WOC". An oil leg is delimited between a water oil contact and a gas oil contact or "GOC". The gas cap is located above the gas oil contact.

The wells 10, 12 to be positioned in the field 14 are producer wells 10 and injector wells 12.

Producer wells 10 aim at the extraction of a desired fluid, i.e. the first fluid and/or the second fluid. Injector wells 12 are also positioned for injecting the third fluid and/or the fourth fluid to enhance the production of the desired fluid at the producer wells 10.

Figure 12:
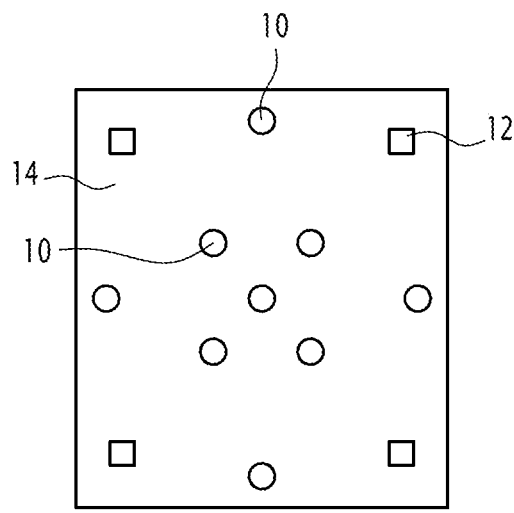
FIG. 12 is a view analogous to FIG. 11 in a peripheral setting.

The wells 10, 12 can be positioned using different patterns. In a dispersed pattern, visible for example in FIG. 11, injector wells 12 are located without preference for area of the reservoir where or close to where injected fluid is originally present. On the contrary, in a peripheral pattern, such as shown in FIG. 12, injector wells 12 are located with a preference for areas of the reservoir where or close to where injected fluid is originally present. The well positioning pattern can be mixed, i.e. be peripheral relative to injectors injecting a particular fluid and dispersed relative to other types of injectors injecting a second type of fluid.

Figure 2:
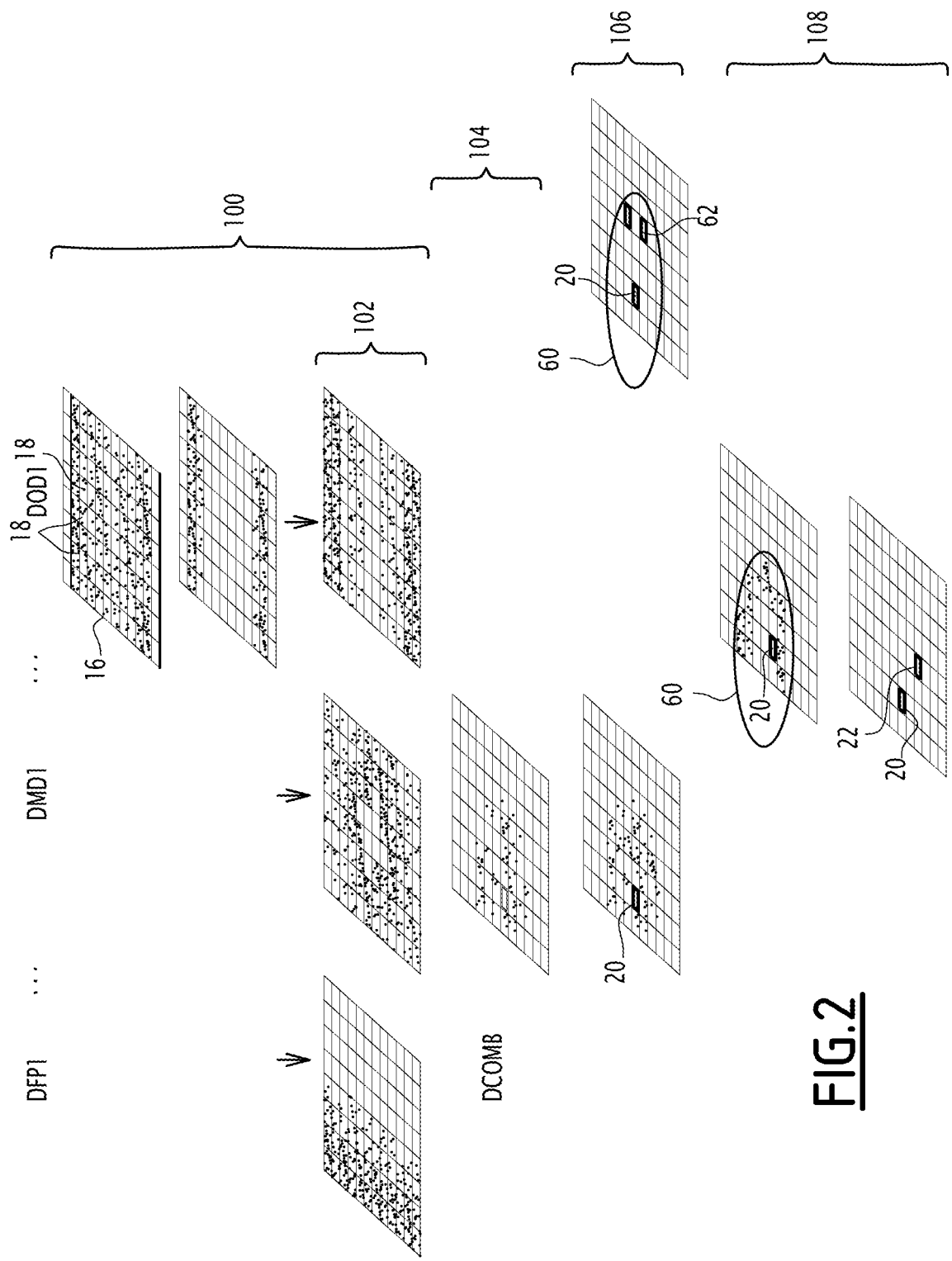
FIG. 2 is a schematic flow chart illustrating steps of the process according to the invention, for positioning one well in a field model having a plurality of cells.

The field 14 is numerically simulated using a geocellular model 16 which is schematically illustrated on FIG. 2 as a two-dimensional grid.

The geocellular model 16 comprises at least one, or sometimes several sets of model realizations, each set containing typically a unique 2D, or 3D grid geometry made of a geocellular grid. The grid geometry is advantageously structured, i.e. follows a geometrical pattern. In a variant, the grid is unstructured.

The grid comprises a plurality of cells 18. Each cell 18 has a specific geographical position in the model, defined by geographical coordinates. Each cell 18 moreover has a shape and a volume.

The model for example comprises more than 1000 cells 18 and generally between 100 0000 cells 18 and 5 000 000 cells 18.

Each cell 18 is associated with cell infilling properties, which characterize the content of the cell 18, as well as the properties of the fluid contained in the cell 18 when applicable.

The cell properties are usually chosen among the net to growth (NTG), the porosity Phi, the total compressibility Ct, the initial saturation in the considered fluid phase Si, the minimum saturation Sm in the considered phase during reservoir flow, the permeability K defined as a XYZ tensor property, K in each direction i=X, Y, Z being noted Ki, a relative permeability, Kr at or behind front for a given injection phase which is also defined as a XYZ tensor property, Krg designating a relative permeability to gas, Krw designating a relative permeability to water and Krwg relative permeability to co-injection of water gas.

Each cell 18 is also characterized by a diffusive pressure propagation slowness Slow, which is a tensor property, by a movable accumulation Accu, which can be defined for the fluid targeted for production and noted AccuP and which can be defined for the fluid targeted for injection as AccuL.

Each cell 18 has general dimensions DX, DY, DZ which can be averaged. Each cell 18 is connected to another cell 18. Inter-cell properties can be defined by a transmissibility between cells 18.

In the model 16, the fluid properties of each cell 18 are advantageously defined by at least a cell infilling property representative of a fluid density and by at least a cell infilling property representative of an ability of a fluid to flow.

A first cell infilling property is advantageously a diffusive slowness Slow, which can be considered on an anisotropic (XYZ tensor) or on a isotropic basis. In a typical form, the slowness Slow in each cell 18 is equal to:

$$\text{Slow} = \text{Phi} \times [\text{NTG, for slowness in } x \text{ and } y \text{ directions}] \times Ct/K(x,y \text{ or } z)/Kr(x,y, \text{ or } z) \quad (1)$$

Variants include degenerated or inflated form of the typical form.

A second cell infilling property is a movable accumulation indicator Accu. In a typical form, the accumulation indicator is equal to:

$$\text{Accu} = \text{Phi} \cdot \text{Ntg} \cdot (Si - Sm) \quad (2)$$

Variants include degenerated or inflated forms of the typical form.

Another cell infilling property is a dimensionless indicator of the ability of a particular fluid to flow in or out of the wells or on/into/towards neighboring wells. In the typical form, the volume weight mean transmissibility Trans in the three-direction can be written as:

$$(DX \cdot DY \cdot KZ/DZ + NTG \cdot DY \cdot DZ \cdot KX/DX + NTG \cdot DX \cdot DZ \cdot KY/DY)/(NTG \cdot (DX \cdot DY \cdot DZ)) \quad (3)$$

Alternatively, a property equal, in each cell 18, to the sum of the transmissibility of all connections to the considered cell 18 divided by the cell volume, or any other indicator of the ability to flow into wells or towards neighboring cells could be used.

The model 16 is for example an assembly of data obtained from a simulation done in a commercial reservoir modeling simulator such as ECLIPSE or IX (INTERSECT) from SCHLUMBERGER, STARS and IMEX from CMG, or any similar product.

In the process according to the invention, each well 10, 12 is defined within the model by at least one well location cell which is referred to as a well insertion point 20 (see for example FIG. 2).

Advantageously, each well 10, 12 is defined by a well drain, which is the part of a well which is producing from or injecting into the reservoir. Well drains can be positioned serially along a common trajectory or in parallel manners. The well drain is defined as a series of consecutive intervals joining cells 18 in which flow between the reservoir and the well occurs.

At minimum, one well insertion point 20 and one predefined drain length, such as a maximum drain length or a half drain length are enough to define a well drain in the process according to the invention. The predefined drain length is an input of the process.

For example, the well insertion point 20 is chosen as the center of the well drain. The predefined drain length is then a maximum half drain length between the drain center and drain ends, defined respectively as toe 22 and heel 24 of the well (see FIG. 10).

In a variant, the well insertion point 20 is at one end of the well, the predefined drain length being a maximum full length of the well drain.

In both cases, the well 10, 12 is defined in the model by a linear segment between the toe 22 and the heel 24.

In another embodiment, the exact path of the well drain is defined from a first well insertion point 20, by determining other well insertion points 20 of the same well 10, 12.

Optionally, one or more well geometry constraints can be defined as inputs of the process, such as a maximum curvature of the well 10, 12, a maximum depth of interval splitting algorithm, or another trajectory constraint feasibility function accepting as an input a set of trajectory points and returning a Boolean indicating whether the set of points represents a feasible trajectory.

Optionally, an additional constraint can be a typical maximum distance between well drains, if the additional drains belonging to the same well are provided.

Figure 1:
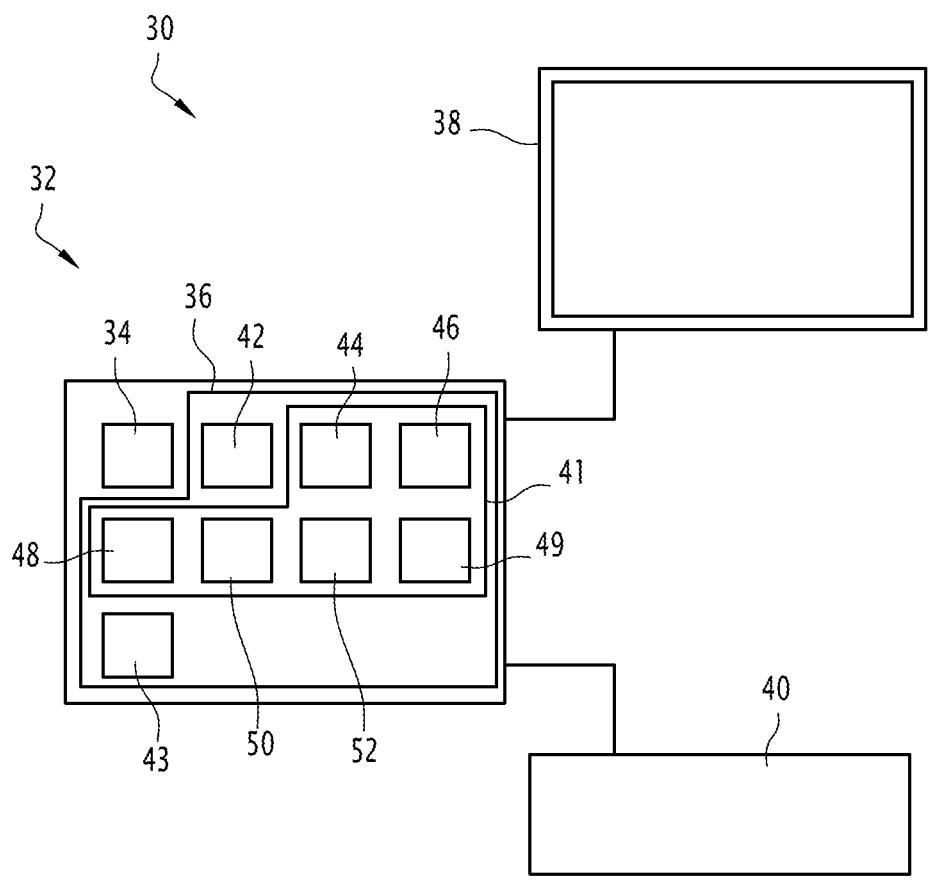
FIG. 1 is a schematic view of a system configured for carrying out a process according to the invention.

The process according to the invention is carried out in a system 30 schematically represented in FIG. 1.

The system 30 generally comprises at least a calculator 32 provided with at least one processor 34, and at least one memory 36 containing software modules configured to be executed by the processor 34.

The system 30 further comprises a display 38 and a man-machine interface 40 generally embodied as a keyboard, a mouse and/or a touch screen.

According to the invention, the memory 36 contains at least a software module 42 for acquiring to the calculator 32 a geocellular model 16 of the field 14, as defined above. The memory 36 comprises a software module 43 for selecting a group of potential cells among cells 18 of the model 16.

The memory 36 contains a software module 41 for positioning wells 10, 12 one after another in the group of potential cells, the software module 41 comprising a plurality of software applications 44 to 49 for calculating individual insertion point drivers.

The software module 41 for positioning wells 10, 12 one after another further comprises a software application 50 for determining a combined insertion point driver based on the individual insertion point drivers obtained by executing software applications 44 to 49 and a software application 52 for defining at least a well insertion point 20 based on the maximized combined insertion point driver determined by the software application 50.

The software module 42 is for example able to acquire data relative to at least one realization of the model 16 obtained by a reservoir modeling simulator. Each model realization includes the definition of the cells 18 of the grid, and at least the cell infilling properties associated with each cell 18.

The software module 43 for selecting a group of potential cells is able to determine, among the cells 18 of each model realization, a group of cells 18 in which a well insertion point 20 can be defined, and to exclude cells in which a well insertion point 20 cannot be defined. Cells in which a well position cannot be defined include for example cells already containing a well, or inaccessible cells given predefined constraints, such as geometrical constraints. Advantageously, the software module 43 is able to provide a Boolean indicator to each cell 18, the Boolean indicator being 1 when the cell 18 belongs to the group of potential cells, the Boolean indicator being 0, when the cell 18 is excluded.

The software applications 44 to 49 include at least a software application 44 for calculating at least a fluid property insertion point driver DFP1, DFP2, and at least a software application 46 for calculating at least a maximized distance insertion point driver DMD1, DMD2, DMD3.

The software applications 44 to 49 also optionally include a software application 48 for calculating an optimal distance insertion point driver DOD1.

In case a detailed path of the well 10, 12 is determined, the software applications 44 to 49 also comprise a software application 49 for calculating a local insertion point driver DL1 for determining a local path of the well drain.

The software application 44 for calculating at least a fluid property insertion point driver DFP1, DFP2 is usually configured for calculating at least two fluid property insertion point drivers, respectively relative to the maximization of a fluid density parameter DFP1 and to the maximization of a fluid flow parameter DFP2.

The fluid property insertion point driver DFP1 aims at determining the cells 18 where there is a high spatial density of the fluid to be produced or injected. The fluid property insertion point driver DFP2 aims at determining the cells 18 where the well to reservoir flow and the reservoir cell to cell flow are easiest for a given phase.

The fluid property insertion point drivers DFP1 DFP2 are generally representative of a fluid property maximization. Preferentially, the fluid property insertion point drivers DFP1, DFP2 are calculated based on a local average density of a given fluid property.

The given fluid property is typically a property reflecting fluid density for fluid property insertion point driver DFP1 or a property reflecting ability of a fluid to flow for fluid property insertion point driver DFP2.

In a particular embodiment, the fluid property reflecting fluid density for fluid property insertion point driver DFP1 is a movable accumulation indicator for a particular phase, as defined above. The fluid property reflecting the ability of the fluid to flow for fluid property insertion point driver DFP2 is a transmissibility.

Advantageously, the fluid property insertion point drivers DFP1, DFP2 are calculated for each cell 18 using a window average of the fluid property around the cell 18 in question. For example, the window average is a decreasing moving average taken in at least two directions from the cell 18 in question.

In particular, the moving average is a normalized exponential moving average (NEMA3D) in three-dimensions. In a structured grid, a normalized exponential moving average is a filter that sums, along predefined directions (typically six [I+, I−, J+, J−, K+, K−] directions in structured grids as shown in FIG. 4), the result of an exponential moving average filter that applies weighting factors which decrease exponentially in the considered direction.

In each direction, the weighing for each successive datum decreases exponentially, never reaching zero, as shown in FIG. 3.

In a variant applicable to structured grids, a smaller subset of directions (e.g. the up, or down direction, particularly suitable in gravity drainage settings) can be used. On the contrary, adding diagonal directions basically launching rays going through series of corresponding cell edges, as shown in FIG. 4, and/or launching rays along vertices directions, as shown in FIG. 5, can be used.

The software application 44 is configured to scan all cells 18 of the group of potential cells and to calculate, for each cell 18, the value of the or each fluid property insertion point driver DFP1, DFP2.

The software application 46 for calculating a maximized distance insertion point driver DMD1, DMD2, DMD3 is able to calculate at least one maximized distance insertion point driver DMD1, DMD2, DMD3, preferentially several maximized distance insertion point drivers DMD1, DMD2, DMD3 determining a maximum distance from a cell or a group of cells having undesired properties for the well 10, 12 currently being positioned.

At least a maximized distance insertion point driver DMD1, DMD2 is determining well cells which are far from cells containing totally or partially a fluid phase which production from or injection into is not desired. A maximized distance insertion point driver DMD3 is determining cells being far from any well of the same type as the well 10, 12 currently being positioned.

Each maximized distance insertion point driver DMD1, DMD2, DMD3 is calculated for each cell 18 by determining a distance to the cell or group of cells with undesired properties.

The distance is for example an Euclidian distance between the cell 18 and the cell or group of cells with undesired properties. In a variant, the distance is a cell count distance from the cell 18 to the cell or group of cells with undesired properties.

Preferentially, according to the invention, each maximized distance insertion point driver DMD1, DMD2, DMD3 is calculated based on a diffusive time of flight (TOF) from the cell 18 to the cell or group of cells with undesired properties. The diffusive time of flight is for example defined as the time of arrival at the cell or group of cells with undesired properties of a pressure wave in a porous medium from a source point being located at the cell 18.

The diffusive time of flight can be easily calculated based on the slowness and geometry of each cell between the cell 18 and the cell or group of cells with undesired properties as described for example in the following publication:

https://en.wikipedia.org/wiki/Level_set_method?oldid=365834229

In one advantageous embodiment, the cell or group of cells with undesired property is a fluid interface. In particular, the fluid interface is a water oil contact (WOC) or a gas oil contact (GOC), as defined above. When the cell or group of cells is an interface, the distance to such interface can be computed in either of the two regions that the interface delimitates. The calculation of the driver is carried out only in one of the two regions with the other region being attributed a zero distance value.

The calculation of time of flight can be made using a phase specific slowness and/or on a non-phase specific slowness as calculated above.

The software application 46 is configured to scan all cells 18 of the group of potential cells and to calculate, for each cell 18, maximized distance insertion point drivers DMD1, DMD2, DMD3 for each scanned cell 18.

As defined above, the software for calculating an optimized distance 48 is able to calculate at least an optimal distance insertion point driver DOD1 related for example to an optimal distance to a well 12, 10 of a different type than the well 10, 12 being positioned.

The optimal distance insertion driver DOD1 is calculated as a maximized distance insertion point driver such as DMD1 or DMD2, by applying a |D−X| transform, where the optimal distance D is an input of the process.

In an advantageous variant, the optimal distance D is determined from the reservoir model along a well pattern scale process. In that case, the software application 48 is able to calculate, for each well 10, 12 being currently positioned, an optimal distance D based on a distance to existing producer wells 10 and based on an accumulation of the produced phase calculated per cell.

The optimal distance D is calculated depending on the setting of the wells. In a dispersed setting, the software application 48 is configured to compute the distance to existing producer wells, and then to compute, for each cell 18, the fraction of the accumulation of the produced phase to the total accumulation of the produced phase as a function of the distance to existing producer wells 10. Then, the software application 48 is able to determine the optimal distance D as equal to the maximum distance at which the accumulation fraction is equal or lower to the fraction FEP of the number of existing producer wells when the current well is being positioned incremented by one unit to the total number of producer wells 10 intended to be positioned. The fraction FEP can optionally be multiplied by a constant factor, comprised for example between 0.1 and 2.

In a peripheral setting, the software application 48 is configured to compute a distance of each cell 18 to existing producer wells 10, then, to sort the accumulation per cell of the produced phase according to the above-computed distance to a producer wells 10, and then to sort the accumulation per cell of the produced and injected phase according to the above-computed distance to producer wells 10.

The software application 48 is then configured to accumulate the produced phase from low to high distance and to cumulate the produced plus injected phase from low to high distance.

The optimal distance D is then defined by the software application 48 as the lowest distance, multiplied by a constant, for which the accumulation ratio between cumulated produced fluid divided by cumulated produced plus injected fluid falls below a predefined threshold.

For example, the constant is chosen to be 0.5 to 2.0. The predefined threshold is for example in the range of 0.70 to 0.75 in a setting in which the oil saturation is constant at 0.8 in the oil leg, and water saturation constant at 0.2 in the oil leg and equal to 1.0 in the water leg. In such situation the cumulated accumulation ratio will be equal to 0.8 for short distance from wells situated in the oil leg and will progressively diminish towards 0 for distances such as to include portions of the water leg.

In an alternate embodiment, the optimal distance D is defined by the software application 48 as the mean distance at the contact between the injected and produced fluid. The method is then faster to operate.

The optimal distance insertion driver DOD1 is calculated for each cell 18 by the software application 48 using an Euclidian distance, a cell count distance and preferentially a diffusive time of flight, as defined above.

The software application 49 is configured to be executed when the particular path of a well drain has to be determined, once at least one insertion point 20 of a well 10, 12 being positioned has been defined.

The software application 49 is configured to calculate a local insertion point driver DL1 to maximize the distance to insertion points already defined for the well 10, 12 being currently positioned. This maximized distance is an Euclidian distance, a cell count distance or preferentially a diffusive time of flight, as defined above.

The software application 49 is configured to calculate the local insertion point driver DL1 only for cells of a local insertion region 60 (see FIG. 2) defined within the predefined drain length distance (e.g. the maximum half drain length distance) of the previously defined center of the well drain. The local insertion point driver DL1 is defined in reference to the insertion points 20 already defined for the well being currently positioned.

The software application 50 is configured to determine a combined injection point driver DCOMB based on at least one fluid property insertion point driver DFP1, DFP2, and on at least one maximized distance insertion point driver DMD1, DMD2, DMD3.

Preferentially, it is able to calculate the combined insertion point driver DCOMB also based on an optimization distance insertion point driver DOD1 and/or with a local insertion point driver DL1, when determining further well insertion points of a well being positioned.

Advantageously, the combined insertion point driver DCOMB is a product of several insertion point drivers, each multiplied by a constant Ci and/or brought to a specific power Ei. The following equation gives an example of calculation of DCOMB using 7 insertion point drivers:

$$DCOMB = (C1 \times DFP1)^{E1} \cdot (C2 \times DFP2)^{E2} \cdot (C3 \times DMD1)^{E3} \cdot (C4 \times DMD2)^{E4} \cdot (C5 \times DMD3)^{E5} \cdot (C6 \times DOD1)^{E6} \cdot (C7 \times DL1)^{E7} \quad (4).$$

The number of insertion point drivers used for calculating the combined insertion point driver DCOMB can be decreased or increased depending on the context. The number of insertion point drivers is generally comprised between 2 and 10, in particular between 2 and 6 when positioning a first insertion point 20 of a well 10, 12, and between 3 and 7 when positioning a further insertion point 20 of the same well 10, 12.

The software application 52 is configured to define at least a well insertion point 20 as a well location cell of a well 10, 12 being currently positioned in the model by selecting among the group of potential cells, the cell 18 which displays the maximal combined insertion point driver DCOMB. In case several locations are equally maximal, the insertion point 20 can be determined either on a neighbored analysis method which will be described below or alternatively, by random choice or by other predefined criteria such as the minimal or maximal cell index among equally maximum cells.

A method according to the invention, using the system 30 according to the invention, will be now described. The method will be described for example for the determination of the positions of several producer wells 10 and several injector wells 12 in a field 14 characterized by one realization of a geocellular model 16 of the field 14.

The process first comprises a step of acquiring by the calculator 32 the model realization of the geocellular model 16 of the field. As explained above, the model 16 defines a plurality of cells 18, each cell 18 being characterized by fluid properties as defined above, in particular a slowness Slow, a movable accumulation indicator Accu and a volume weight mean transmissibility Trans in the three-directions.

The calculator 32 advantageously lets the user select the different constraints as defined above using the man/machine interface 40. This includes in particular the half drain maximum length or full drain length and/or the above-defined geometrical constraints.

The user also selects a number of wells 10, 12 for each well type, and a type of well pattern.

Based on this selection, the calculator 32 determines the type of well 10, 12 to be inserted next. The order for inserting wells 10, 12 is defined as a function of the well pattern which has been selected by the user for the concerned fluid. For example, producer wells 10 are always part of a dispersed setting.

In a peripheral setting, wells 10, 12 are introduced per well types. The order of the well types is defined according to a typical well type ordering following the following rules:
  producer wells 10 have priority over injector wells 12.
  among producer wells 10 and among injector wells 12:
    oil wells (producer wells 10 or injector wells 12) have priority over other wells,
    gas wells have priority over water wells,
    gas and water injector wells have priority over water wells,
    water wells have lowest priority.

In a dispersed setting, wells 10, 12 are introduced one by one starting with the well types that would minimize the difference between the current and target well type proportions. The target proportions are computed at the perimeter of the dispersed well types. In case of equality, the next well to be introduced is selected based upon well type as defined above.

In any case, the wells 10, 12 are positioned one after the other. The positioning of a subsequent well 10, 12 only occurs when the positioning of a former well 10,12 has been completed and taken into account in the model 16.

For each well 10, 12 being inserted, the process then comprises a selection by the software module 43 of a group of potential cells able to become a well location.

Then, as shown in FIG. 2, for each cell 18 of the group of potential cells, the process comprises a step 100 of calculation of several or all insertion point drivers among the insertion point drivers DFP1, DFP2, DMD1, DMD2, DMD3, DOD1, DL1 by the relevant software applications 44 to 49 to determine at least a first insertion point of the well currently being positioned.

As mentioned above, at least one fluid property insertion point driver DFP1, DFP2 representative of a fluid property maximization is calculated for each cell 18. Advantageously, two fluid property insertion point drivers DFP1, DFP2 are calculated by software application 44 to determine the cells 18 having maximized fluid density and maximized fluid flow.

The software application 44 calculates the or each fluid property insertion point driver DFP1, DFP2 of each cell 18 advantageously based on a window average of the fluid property around the cell 18, preferentially based on a decreasing moving average in at least two directions and more preferentially based on a normalized exponential moving average, as described above.

Advantageously, the two fluid properties used for calculating the two fluid property insertion point drivers DFP1, DFP2 are respectively an accumulation Accu in one phase and a transmissibility Trans, as defined above.

The software application 46 calculates at least one maximized distance insertion point driver DMD1, DMD2, DMD3 for each cell 18 characterizing a distance maximization to another cell or group of cells with an undesired property.

Preferentially, the cell or group of cells having undesired properties are cells totally or partially containing a fluid phase which production from or injection into is not desired or are cells or groups of cells of any well of the same type than the well being positioned.

In particular, the software application 46 calculates a maximum distance from each cell 18 to a fluid interface, for example a WOC or a GOC.

Preferentially, the distance is calculated based on a diffusive time of flight as mentioned above, using a cell slowness and geometry for each cell on the path between the cell 18 and the cell or group of cells having undesired properties.

The software application 48 optionally calculates an optimized distance insertion point driver DOD1 based on an optimal distance D to wells of a different type than the well being positioned.

The optimal distance D is either predefined by the user, for example using the man/machine interface 40 or is computed directly by the software application 48 for each well being positioned, as described above, depending on the chosen setting (dispersed setting or peripheral setting), on a distance to existing producer wells 10 and/or on accumulation of the produced phase for each cell.

As shown in step 102 in FIG. 2, once each fluid property insertion point driver DFP1, DFP2, DMD1, DMD2, DMD3, DOD1 being used has been calculated for each cell 18, each insertion point driver value obtained for each cell 18 is normalized relative to the maximal value of the same insertion point driver among the cells 18 of the group of potential cells.

Then, as shown in step 104, the software application 50 calculates a combined insertion point driver DCOMB for each cell 18, for example according to the above-mentioned equation (4), each multiplied by a predefined tunable constant $C_i$ and/or brought to a predefined tunable power $E_i$.

As shown in step 106, the software application 52 for defining a well location cell then identifies the cell 18 having the maximum combined insertion point driver value, which constitutes a first well insertion point 20. The first insertion point 20 is usually considered the well center of the well 10, 12 being positioned.

If no predefined half drain length or local insertion point driver has been provided, the well 10, 12 is defined as a single cell well and the process starts positioning a new well by repeating the above described steps.

If a predefined half drain length has been defined, the process comprises a definition typically of the two ends 22, 24 of the well drain in a predefined order based on the predefined half drain length.

Alternatively, the first insertion point 20 is the toe 22 or heel 24 of the well 10, 12 being positioned. The full drain length is used to determine the other end of the well.

As shown in step 108 of FIG. 2, cells within the predefined drain length distance of the previously defined insertion point 20 are identified and grouped in a local insertion region 60.

The software application 49 for calculating a local insertion point driver then calculates a local insertion point driver DL1 for each cell in the above-mentioned defined region 60.

Then, the previous insertion point drivers DFP1, DFP2, DMD1, DMD2, DMD3, DOD1 for each of the cells 18 of the local insertion region 60, determined at step 100, are combined to the local insertion point driver LD1 to obtain a combined insertion point driver DCOMB (using equation 4). The cell 62 maximizing the combined insertion point driver DCOMB is determined by the software application 52.

The feasibility of the trajectory including the already positioned insertion points 20 of the current well 10, 12 is checked. If feasible, the new point at cell 62 is added to the trajectory. If not feasible, the cell is removed from the local insertion region 60 and the local determination step 108 is re-iterated until there are no potential cells or a solution is found. If there are no cell left the process is deemed complete for the well 10, 12 being positioned.

The above-mentioned well definition including all insertion points 20 of the well 10, 12 is then inserted in the model.

The process is then re-iterated to position another well 10, 12 until the numbers of wells 10, 12 defined by the user have been positioned.

The process may comprise a subsequent step of displaying the positions of the wells 10, 12 on a display such as display 38. The positions of the wells 10, 12 may then be used in a drilling operation to drill at least a well 10, 12 in the field 14.

Examples of insertion point driver policies are given in the following examples

Example 1: Producer and Water Injector Configuration in a Dispersed Setting and with Wells Defined as Two Linked Segments

| Driver | Oil producer | Water injector |
|---|---|---|
| DMD1 [TOF to WOC] | Using non phase specific slowness | Not used |
| DMD2 [TOF to GOC] | Using non phase specific slowness | Not used |
| DMD3 [TOF to wells of same type] | Using non phase specific slowness | Using non phase specific slowness |
| DL1 [TOF to current well] | Using non phase specific slowness | Using non phase specific slowness |
| DOD1 [TOF to Optimized distance] | Using non phase specific slowness, relative to water injector wells | Using non phase specific slowness, relative to producer wells |
| DFP1 [NEMA3D] | Using oil accumulation | Using water plus oil accumulation |
| DFP2 [NEMA3D] | Using non phase specific transmissibility | Using non phase specific transmissibility |

In such setting, the behavior can be finely tuned in a number of optional variants to balance the computational cost to quality of result ratio.

Slowness can be defined in a phase specific manner. This added complexity is unnecessary unless a large contrast exists across the well implantation area for the relative mobility to a given phase (which is very unlikely in oil and gas reservoir environments).

Would the water and oil saturation not vary significantly over the reservoir target, for speeding up or simplifying setup, pore volume is used rather than phase specific accumulation.

Phase specific transmissibility could be used particularly for injectors. This allows factoring the reduction of injectivity index for water injector wells completed in part or totality in oil compared to wells completed in the water leg.

In a dispersed setting, partially peripheral patterns can be built by introducing distance to WOC or distance to WOC with a predetermined offset as a maximized distance insertion point driver.

In a dispersed water injection/oil production setting, gas areas are avoided because of the impact of gas upon water injectivity and because gas area would typically be located above oil, thus determining an unfavorable situation relative to gravity forces.

Example 2: Gas Injection, Water Injection and Oil Production Peripheral Pattern with Wells Defined by a Single Cell

| Driver | Oil producer | Water injector | Gas injection |
|---|---|---|---|
| DMD1 [TOF to WOC] | Using non phase specific slowness | With offset, using non phase specific slowness | With offset, using non phase specific slowness |
| DMD2 [TOF to GOC] | Using non phase specific slowness | With offset, using non phase specific slowness | With offset, using non phase specific slowness |
| DMD3 [TOF to wells of same type] | Using non phase specific slowness | Using non phase specific slowness | |

-continued

| Driver | Oil producer | Water injector | Gas injection |
| --- | --- | --- | --- |
| DL1 [TOF to current well] | Using non phase specific slowness, one implementation relative to water injector wells, another relative to gas injector wells | Using non phase specific slowness, relative to producer wells | Using non phase specific slowness, relative to producer wells |
| DOD1 [TOF to Optimized distance] | Using oil accumulation | Using water plus oil accumulation | Using gas plus oil accumulation |
| DFP1 [NEMA3D] | Using oil transmissibility | Using water transmissibility | Using gas transmissibility |

In advantageous variants, the distance to the contact between the oil and the injected phase is computed in both the oil and injected phase regions and is given arbitrary signs (ex: positive within the injected phase region, negative outside).

Such a distance is advantageously modified by adding a positive offset distance value and then, setting negative values to zero. Using such a modified distance as positioning driver allows positioning injector wells in the oil zone within a fixed time of flight distance to the true contact while favoring wells further within the injected fluid region. The offset value is a predefined input defining the policy. It is for example comprised between 0.5 and 1.0 of the mean distance between the top of the structure and the water or gas contact.

Figure 7:
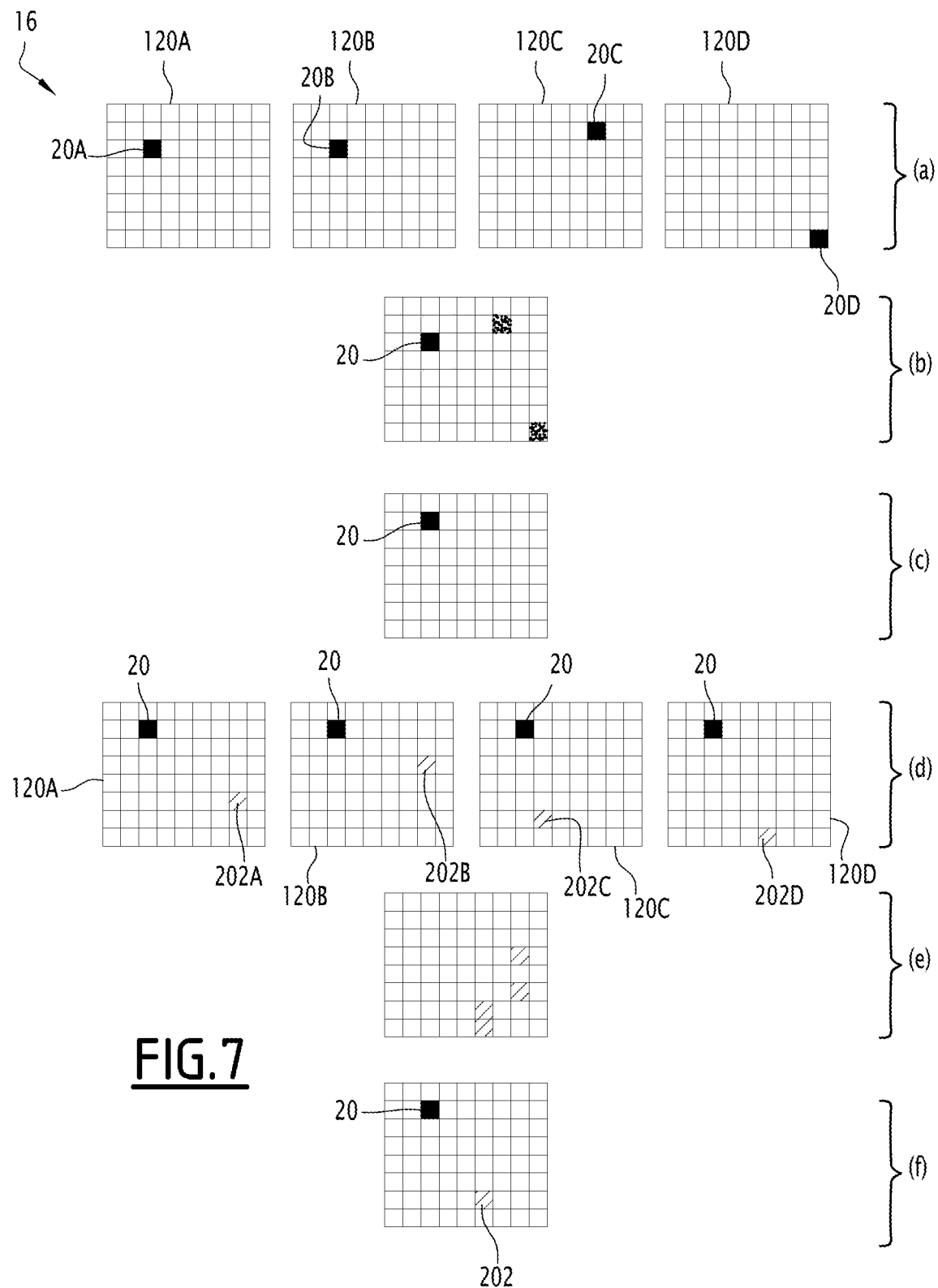
FIG. 7 is a schematic view of an implementation of the process according to the invention when a series of model realizations are provided.

In another variant, illustrated in FIG. 7, the model 16 comprises several model realizations 120A to 120D. The software module 42 is able to provide several model realizations to the calculator 32.

The process according to the invention differs from the process described for a single model realization of the model 16 in that for each well 10, 12 being positioned, a location of the first insertion point 20 of the well 10, 12 is calculated for each model realization 120A to 120D, using point insertion drivers DFP1, DFP2, DMD1, DMD2, DMD3, DOD1 according to the above-described steps 100 to 108.

The result leads to a plurality of first potential first well insertion points 20A to 20D, each insertion point 20A to 20D corresponding to a realization 120A to 120D of the model 16 (FIG. 7 a).

Figure 8:
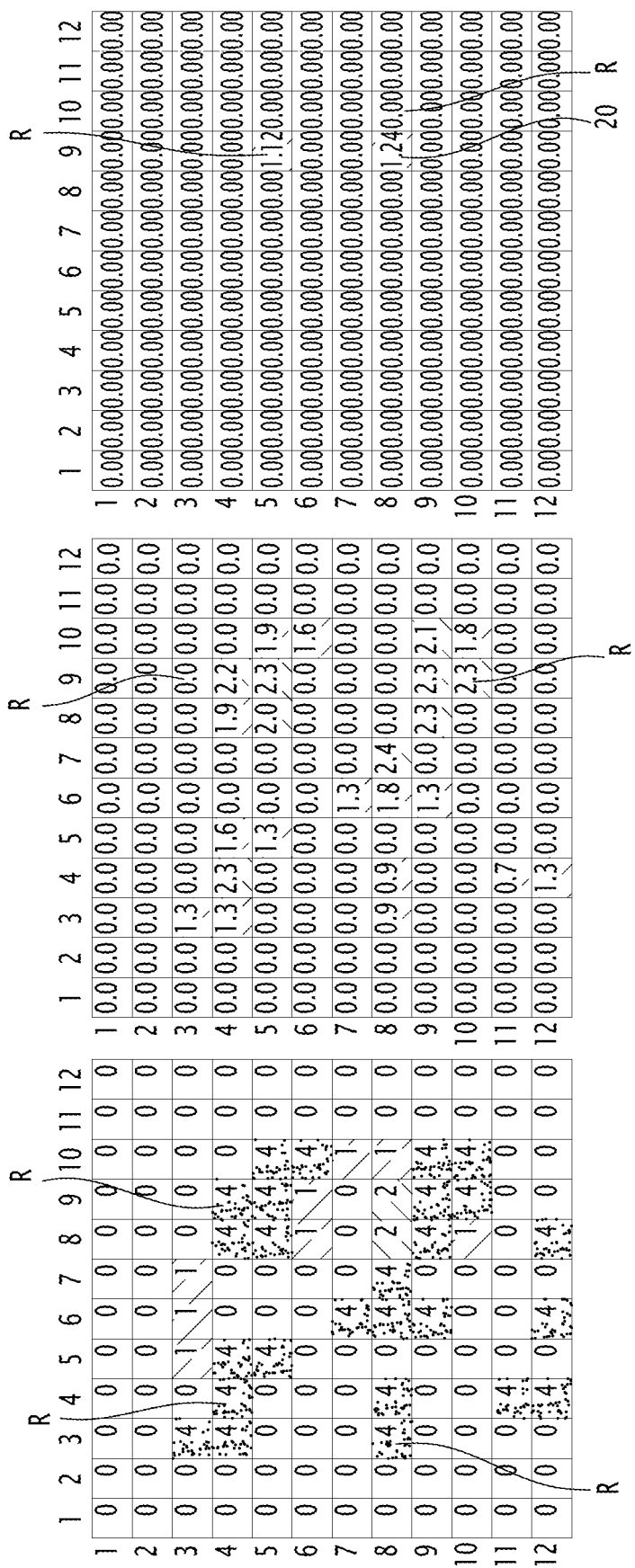
FIG. 8 is a schematic view of the process for selecting a well location when applying the process according to the invention to several model realizations.
Figure 9:
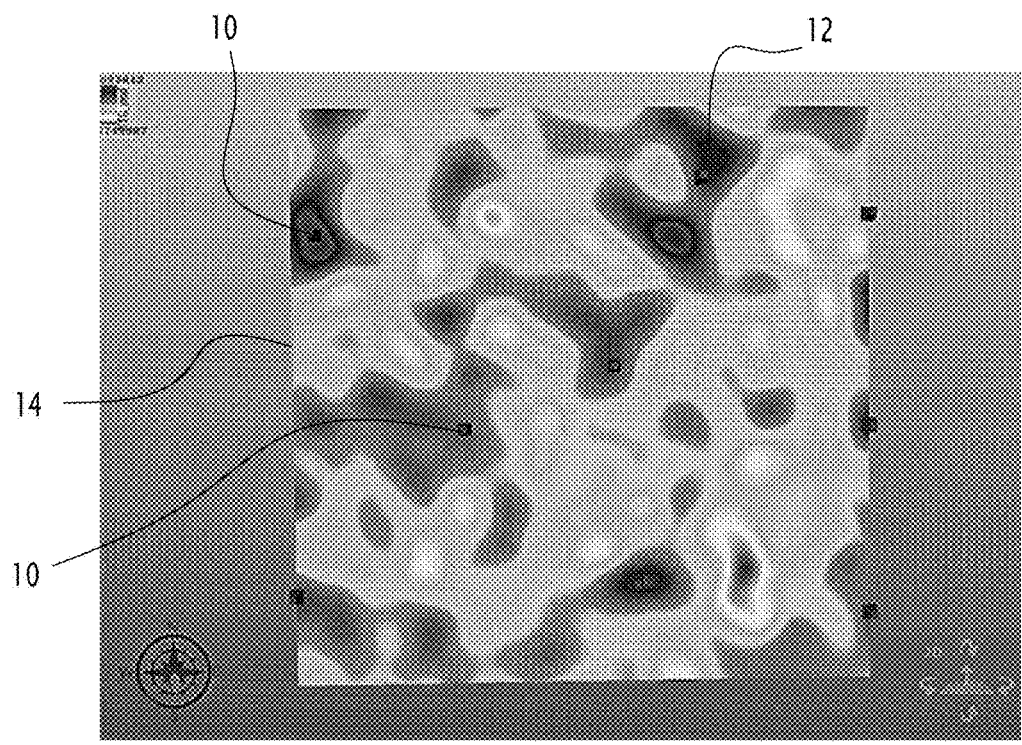
FIG. 9 is a XY view of the positioning of several wells in a field after carrying out the process according to the invention.
Figure 10:
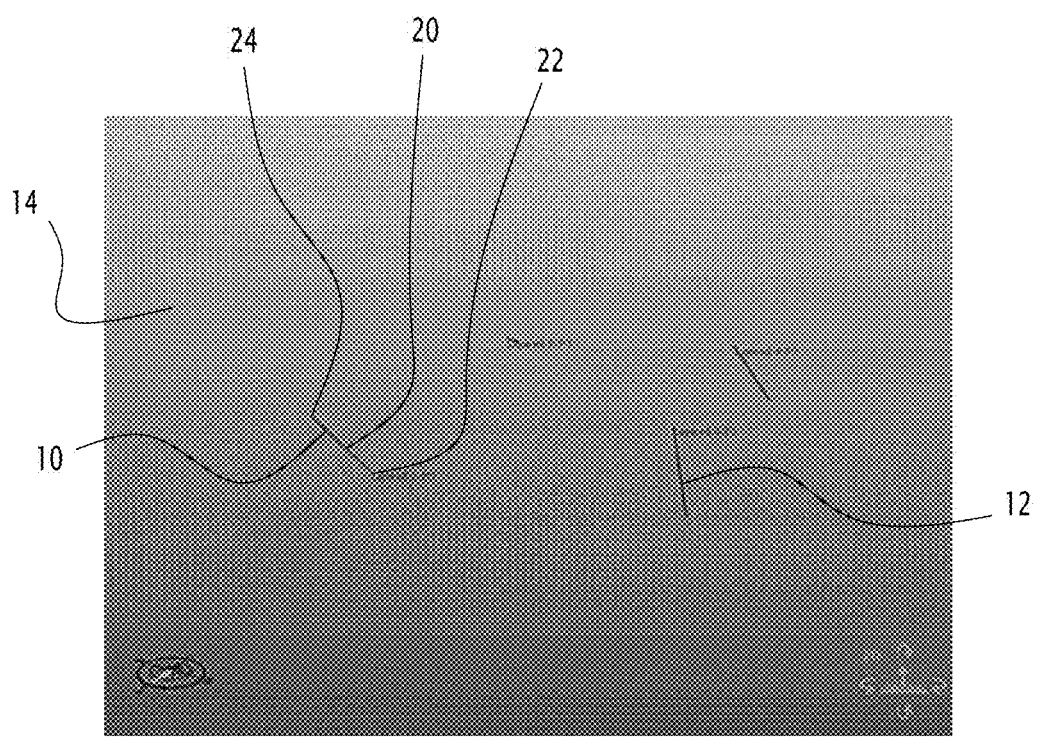
FIG. 10 is a XZ view analogous to FIG. 9.
Figure 11:
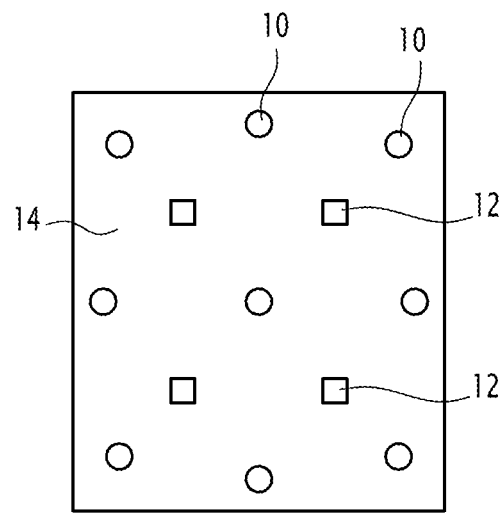
FIG. 11 is a schematic view of a pattern of well location obtained in a dispersed setting of the wells.

Then, in FIGS. 7 b) and c) the calculator 32 determines a location presenting the highest density of possible insertion points 20A to 20D by executing the location determination method disclosed schematically in FIG. 8.

The location determination method comprises defining an initial maximum value as a negative infinite.

Then, the method comprises scanning all cells 18, checking if cell value is greater than maximum, and if so, updating maximum.

The method then comprises scanning all cells 18 and building a group of cells (region R) where insertion point density is maximal. An adjacency depth factor is initialized to zero. For every cell in the region R defined previously, the method comprises computing the average density across all cells 18 adjacent within the current depth factor to the considered cell.

The adjacency depth is defined as the minimum number of adjacent cells connecting two cells. The group of cell "adjacent with depth zero" to a given cell is limited to the considered cell, the group of cells "adjacent at depth one" to a given cell correspond to the considered cell and its neighbors, the group of cells "adjacent at depth 2" corresponds to the neighbors of neighbors and cells adjacent at depths 0 and 1, and so forth.

The method comprises scanning all cells 18 in region R to determine a maximal average density and identifying all cells 18 in region R which average density is maximal. The method then comprises redefining R to such region.

If the number of cells in region R is one, the cell location is the well insertion point 20. If not, if the width is such to include all model cells then return the cell location closest to the mean geographic cell location of all cells in the region initially defined above. Else, the method increments the adjacency depth factor by one and loop back to computing the average density across all cells adjacent within the current depth factor to the considered cell until a well location point 20 is determined (FIG. 7c).

Then, in reference to FIG. 7d), at least another first insertion point 202 of another well 10, 12 is determined as described above. For determining the other first insertion point of the other well, the position of the insertion points 20 of the previously positioned wells 10, 12 such as the first well 10, 12 is kept the same in each model realization 120A to 120D.

The process of determining a well position for each subsequent well 10, 12 is then reiterated, keeping constant the positions of each well 10, 12 already positioned (FIG. 7 d-f).

Thanks to the process according to the invention, a quick and accurate positioning of a plurality of wells 10, 12 in a field 16 is obtained. The process is very efficient in terms of numbers of used variables, since a typical form of the process requires only seven drivers, for the simple problem of positioning a single linear well drain (scaling factors for distance to WOC, GOC, inter-well distance, movable accumulation indicator and transmissibility, and maximum distance between well center and well ends).

This has to be compared to the geographic formulation, which requires three geographic coordinates multiplied by two well ends 20, 22, i.e. 6 total parameters multiplied by the number of wells.

For example for fifteen wells 10, 12, the ratio of parameters diminishes from 90 to 7 in the process according to the invention. The process according to the invention greatly reduces the computational time required for optimizing well patterns. Moreover, the process by nature points to the most relevant areas for positioning the wells 10, 12 in the field 14, hence reducing human working time required for building well patterns and improving performance of the resulting well pattern.

In particular, when time of flight is used as a measurement of distance, the accuracy of the obtained results is greatly improved, while the computational needs remain quite low. The use of a moving average around each cell 18 also allows a quick and accurate determination of the fluid density insertion point drivers.

In a variant, the method applies to the design of carbon dioxide injection wells in carbon dioxide sequestration applications or to the design of water injection wells in hydrogeological applications. The well placement priorities as defined above are inverted, the injector wells having priority over producer wells

What is claimed is:
1. A process to define the locations of a plurality of wells in a field, the locations being used in a drilling operation to drill at least a well in the field, the process being carried out by an electronic location defining computer and comprising:

acquiring a geocellular model of the field, the geocellular model defining a plurality of cells, each cell being provided with fluid properties including at least a fluid density property and at least a fluid flow property for at least two fluid phases;

selecting a group of potential cells able to become a well location;

positioning wells one after another in the group of potential cells, each positioning of a well comprising:
- determining for each cell of the group of potential cells, at least one fluid property insertion point driver representative of a fluid property maximization, the fluid property insertion point driver being determined by using a window average of the fluid property taken around the cell;
- determining for each cell of the group of potential cells, at least one maximized distance insertion point driver, representative of a maximization of a distance to another cell or group of cells having at least an undesired property, the undesired property being chosen among a cell containing a fluid phase which production from or injection into is not desired or a cell containing a well of the same type that the well being positioned, the at least one maximized distance insertion point driver being determined for each cell by determining a distance to the cell or group of cells with undesired properties by using a diffusive time of flight from the cell to the cell or group of cells having undesired properties;
- determining for each cell of the group of potential cells a combined insertion point driver by using the at least one fluid property insertion point driver and the at least one maximized distance insertion point driver, each insertion point driver being determined for each cell as normalized relative to the maximal value of the same insertion point driver among the cells of the group of potential cells; and
- defining a well insertion point of the well, the well insertion point being positioned at the cell having a maximal combined insertion point driver; and drilling the plurality of wells at locations in the field corresponding to each of the defined well insertion points.

2. The process according to claim 1, wherein each successive positioning of a well comprises determining, for each cell of the group of potential cells, at least one optimization distance insertion point driver representative of an optimized distance to wells of different types than the well being positioned, the combined insertion point driver being further determined by using the at least one optimization distance insertion point driver.

3. The process according to claim 2, wherein the optimized distance is determining, for each well being positioned, by using a distance to at least one already defined producer well and by using an accumulation of the produced phase in each cell.

4. The process according to claim 1, wherein the cells or group of cells having undesired properties are located at an interface between two fluids.

5. The process according to claim 1, wherein the fluid property insertion point driver is determined from a decreasing moving average in at least two directions from each cell.

6. The process according to claim 1, wherein each successive positioning of a well comprises, after at least an insertion point of a well has been positioned, determining at least one local insertion driver maximizing the distance to other cells of the same well, the combined insertion point driver being determining further by using the at least one local insertion driver.

7. The process according to claim 1, wherein each successive positioning of a well comprises, after at least an insertion point of a well has been positioned, defining a toe and a heel of the well by using a predefined drain length distance.

8. The process according to claim 7, comprising defining a local insertion point region by using the predefined drain distance, and/or by using a geometrical constraint.

9. The process according to claim 1, wherein the fluid density property comprises a fluid accumulation, the fluid flow property comprising a transmissibility.

10. The process according to claim 1, comprising defining the location of a plurality of producer wells and of a plurality of injector wells, the process comprising positioning all the producer wells, then positioning all the injector wells or placing alternatively producer wells and injector wells.

11. The process according to claim 1, wherein acquiring a geocellular model of the field comprises acquiring a plurality of model realizations of the model,
the process comprising determining at least a first insertion point for a first well in each of the model realizations by using a maximized combined insertion point driver for each model realization and defining a preferred insertion point for the first well common to each model realization, by using the plurality of first insertion points for the first well in each of the model realizations; then
placing at least a second well insertion point for a second well distinct of the first well in each of the model realizations by using a maximized combined insertion point driver for each model realization, without modifying the position of the or each insertion point for the first well defined by using the plurality of model realizations.

12. The process according to claim 1, wherein determining each insertion point driver for each cell comprises normalizing the insertion point driver by using the maximal value of the insertion point driver among all cells.

13. A well drilling system, comprising:
an electronic system configured to define the location of a plurality of wells in a field, the locations being used in a drilling operation to drill at least a well in the field, the electronic system comprising a computer having a processor configured to:
acquire a geocellular model of the field, the model defining a plurality of cells, each cell being provided with fluid properties including at least a fluid density property and at least a fluid flow property for at least two fluid phases;
select a group of potential cells able to become a well location; and
position wells one after another in the group of potential cells by:
- determining for each cell of the group of potential cells, at least a fluid property insertion point driver representative of a fluid property maximization, the fluid property insertion point driver being calculated by using a window average of the fluid property taken around the cell;
- determining for each cell of the group of potential cells, at least a maximized distance insertion point driver representative of a maximization distance to another cell or group of cells having at least an undesired property, the undesired property being chosen among a cell containing a fluid phase which production from or injection into is not desired or a cell containing a well of the same type that the well being positioned, the at least one maximized distance insertion point driver being determined for each cell by using a diffusive time of flight from the cell to the cell or group of cells having undesired properties;

determining for each cell of the group of potential cells a combined insertion point driver based at least on the fluid property insertion point driver and the maximized distance insertion point driver, each insertion point driver being determined for each cell as normalized relative to the maximal value of the same insertion point driver among the cells of the group of potential cells; and defining a well insertion point of the well being positioned at the cell having a maximal combined insertion point driver; and a driller configured to drill the plurality of wells at locations in the field corresponding to each of the defined well insertion points.

14. The process according to claim 4, wherein the interface between two fluids is a gas-to-oil interface or an oil-to-water interface, and/or an interface between two fluids with a predefined offset.

15. The process according to claim 12, wherein determining the combined insertion point driver comprises multiplying each insertion point driver with a predefined constant and bringing the product of the insertion point driver with the predefined constant to an exponent.

16. The process according to claim 5, wherein the decreasing moving average is a normalized exponential moving average in three directions.

17. A process to define the locations of a plurality of wells in a field, the process being carried out by an electronic location defining computer and comprising:

acquiring a geocellular model of the field, the geocellular model defining a plurality of cells, each cell being provided with fluid properties including at least a fluid density property and at least a fluid flow property for at least two fluid phases;

selecting a group of potential cells able to become a well location;

positioning wells one after another in the group of potential cells, each positioning of a well comprising:
calculating for each cell of the group of potential cells, at least one fluid property insertion point driver representative of a fluid property maximization;
calculating for each cell of the group of potential cells, at least one maximized distance insertion point driver, representative of a maximization of a distance to another cell or group of cells having at least an undesired property, the undesired property being chosen among a cell containing a fluid phase which production from or injection into is not desired or a cell containing a well of the same type that the well being positioned;
calculating for each cell of the group of potential cells a combined insertion point driver based on the at least one fluid property insertion point driver and the at least one maximized distance insertion point driver,
determining a cell among each cell of the group of potential cells among having a maximal combined insertion point driver; and
defining a well insertion point of the well, the well insertion point being positioned at the cell having a maximal combined insertion point driver; and drilling the plurality of wells at locations in the field corresponding to each of the defined well insertion points, wherein the fluid property insertion point driver is calculated based on a window average of the fluid property taken around the cell, and wherein the fluid property insertion point driver is calculated from a decreasing moving average in at least two directions from each cell.

18. A process to define the locations of a plurality of wells in a field, the process being carried out by an electronic location defining computer and comprising:

acquiring a geocellular model of the field, the geocellular model defining a plurality of cells, each cell being provided with fluid properties including at least a fluid density property and at least a fluid flow property for at least two fluid phases;

selecting a group of potential cells able to become a well location;

positioning wells one after another in the group of potential cells, each positioning of a well comprising:
calculating for each cell of the group of potential cells, at least one fluid property insertion point driver representative of a fluid property maximization;
calculating for each cell of the group of potential cells, at least one maximized distance insertion point driver, representative of a maximization of a distance to another cell or group of cells having at least an undesired property, the undesired property being chosen among a cell containing a fluid phase which production from or injection into is not desired or a cell containing a well of the same type that the well being positioned;
calculating for each cell of the group of potential cells a combined insertion point driver based on the at least one fluid property insertion point driver and the at least one maximized distance insertion point driver,
determining a cell among each cell of the group of potential cells among having a maximal combined insertion point driver; and
defining a well insertion point of the well, the well insertion point being positioned at the cell having a maximal combined insertion point driver; and drilling the plurality of wells at locations in the field corresponding to each of the defined well insertion points, wherein each successive positioning of a well comprises, after at least an insertion point of a well has been positioned, defining a toe and a heel of the well based on a predefined drain length distance.

19. The process according to claim 1, wherein the geocellular model comprises more than 1,000 cells.

20. The process according to claim 1, wherein the geocellular model comprises more than 100,000 cells.

21. The process according to claim 1, further comprising:
generating a non-transitory computer-readable medium storing the well insertion points of successive wells,
wherein the stored well insertion points are displayed on a display or are referenced during a drilling a well in the field.

* * * * *